United States Patent [19]
Wiltzer et al.

[11] Patent Number: 6,136,947
[45] Date of Patent: Oct. 24, 2000

[54] PROCESS AND DEVICE FOR THE STANDARDIZED CONTINUOUS PRODUCTION OF POLYAMIDES

[75] Inventors: Karlheinz Wiltzer, Bad Blankenburg; Peter Lausmann, Rudolstadt; Baldur Ebert, Bad Blankenburg, all of Germany

[73] Assignee: Polymer Engineering GmbH, Germany

[21] Appl. No.: 09/077,737

[22] PCT Filed: Dec. 10, 1996

[86] PCT No.: PCT/EP96/05514

§ 371 Date: Nov. 13, 1998

§ 102(e) Date: Nov. 13, 1998

[87] PCT Pub. No.: WO90/21758

PCT Pub. Date: Jun. 19, 1997

[30] Foreign Application Priority Data

Dec. 12, 1995 [DE] Germany ............................ 195 46 417

[51] Int. Cl.[7] .......................... C08G 69/16; C08G 69/04; C08G 69/28
[52] U.S. Cl. .......................... 528/310; 528/322; 528/323; 528/332; 528/335; 528/336
[58] Field of Search ..................................... 528/310, 322, 528/332, 335, 336, 323

[56] References Cited

U.S. PATENT DOCUMENTS 4,246,395  1/1981  Martimer ................................. 528/340
5,646,191  7/1997  Wiltzer et al. .......................... 521/49.8
5,902,553  5/1999  Wiltzer et al. .......................... 422/131

FOREIGN PATENT DOCUMENTS 0098412A   1/1984   European Pat. Off. .
0129195A  12/1984   European Pat. Off. .
0288893A  11/1988   European Pat. Off. .
0393546A  10/1990   European Pat. Off. .
2297875A   8/1976   France .

Primary Examiner—P. Hampton-Hightower
Attorney, Agent, or Firm—Ostrolenk, Faber, Gerb & Soffen, LLP

[57] ABSTRACT

A process and device for the standardised continuous production of polyamide 6, polyamide 6.6 and/or copolyamides from e-caprolactam and/or adipic acidic hexamethylenediamine or adipic acid and hexamethylenediamine uses a combination of known specific processes to design a polymerisation reactor in which product with sufficiently high quality can be produced with the most efficient possible use of the energy applied and in such a way that the initial substances can be used alternately in the individual processing stages: pre-heating of the initial products using a common heat exchanger to 190–300° C.; polymerisation of the initial products in a pressure stage with or without elimination of water and product recycling at 150–280° C. and a pressure of <20 bar, dewatering of the polymer melt in a one to five turn coil under slow pressure reduction; and final condensation of the melt in at least one common vertical reactor at temperatures of between 210 and 285° C.

15 Claims, 1 Drawing Sheet

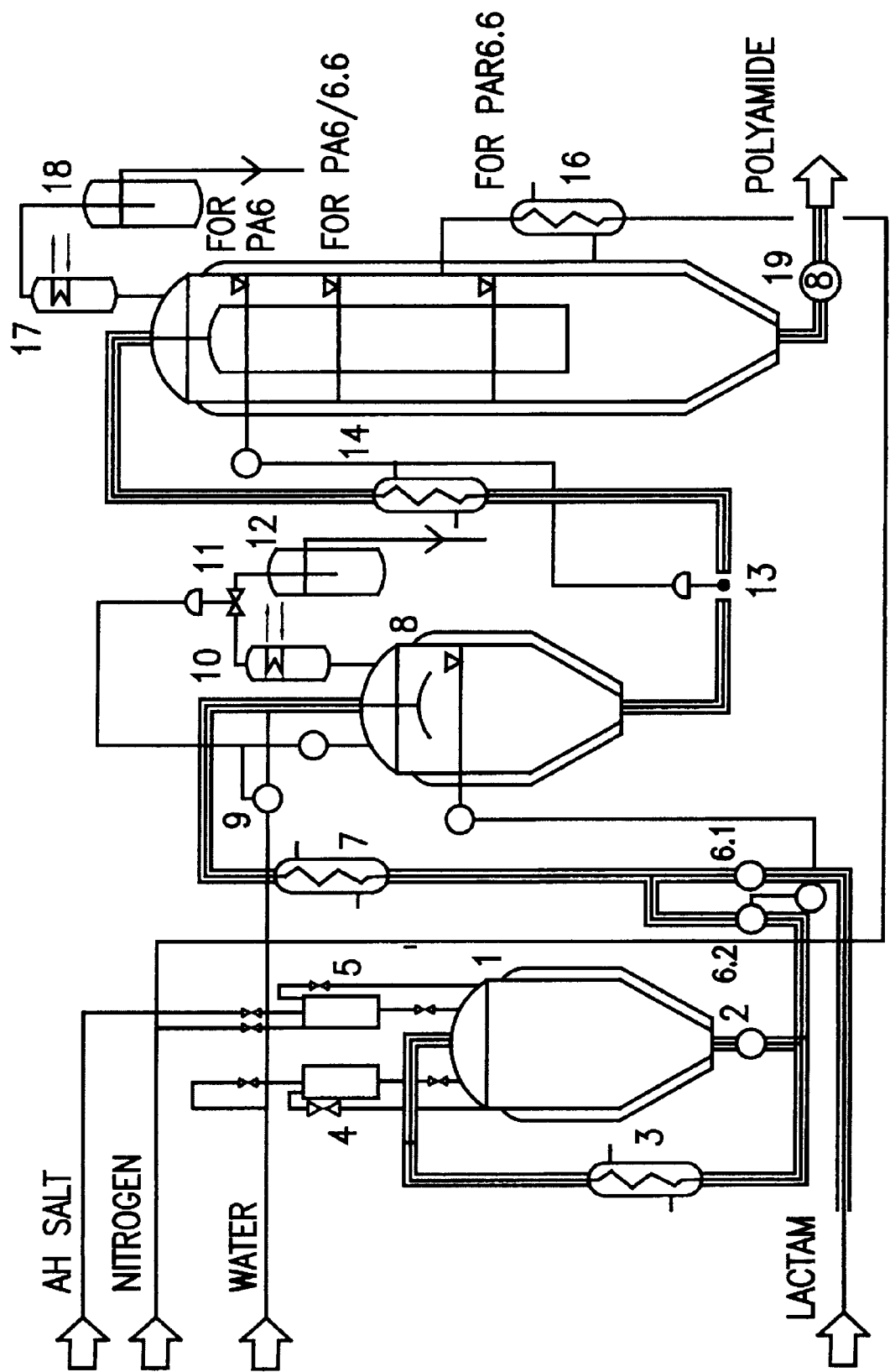

PROCESS AND DEVICE FOR THE STANDARDIZED CONTINUOUS PRODUCTION OF POLYAMIDES

BACKGROUND OF THE INVENTION

The invention relates to a process and a device for carrying out a process for the continuous production of, in particular, polyamide 6, polyamide 6.6 and copolyamides from $\epsilon$-caprolactam and/or a salt of adipic acid with hexamethylenediamine or adipic acid and hexamethylenediamine. It is known that the production of polyamide 6, polyamide 6.6 and copolyamides should be carried out in sequences specially adapted in each case to the requirements of the product and with an arrangement of apparatus tailored to an optimal process sequence.

The polymerization of $\epsilon$-caprolactam involves hydrolysis, polyaddition and polycondensation reactions whose most advantageous reaction rates occur in each case under other conditions. The hydrolysis of $\epsilon$-caprolactam to $\epsilon$-aminocaproic acid is the first and slowest reaction of the polymerization process. Expediently, the hydrolysis is carried out at high temperatures and with high water contents of the reaction mixture in the first process stage, in order to utilize the maximum possible hydrolysis rate. This process has to be carried out in a pressure stage. A low-viscosity product is formed. In this pressure stage, a viscosity limit is usually imposed by the added amount of water. In order to achieve the viscosity required for the processing of the polymer, the water added in excess to the pressure stage is expelled in one or more subsequent process stages operated at atmospheric pressure.

The desired viscosity is established by adding chain terminators at the beginning of the polymerization process and by a specific temperature program in the individual reaction steps (East German patent 133 681).

For the polymerization of a salt of adipic acid with hexamethylenediamine or adipic acid and hexamethylenediamine, it is known that an aqueous AH salt solution, which is heated in a pressure reactor to a temperature in the range of 220–280° C., is used as a starting material, with the aim of preparing an AH salt precondensate in which the $NH_2$ groups of the hexamethylenediamine are virtually all reacted with the COOH groups of adipic acid. It is also known that the aqueous hexamethylenediamine/adipic acid salt solution is heated under pressure with simultaneous evaporation of the water, and the expelled diamine is retained in a column and is recycled to the polymerization process. When such a precondensate is let down to atmospheric pressure, hexamethylenediamine can scarcely escape and no viscosity-reducing excess of acid is obtained. Dewatering and post-condensation of the polyamide 6.6 melt is carried out in principle as for the production of polyamide 6. The dewatering stage should however be adjusted and dimensioned for substantially more extensive dewatering (U.S. Pat. No. 2,689,839; German Offenlegungschrift 2,401,474). Known processes for the production of copolyamides from aqueous AH salt solution and $\epsilon$-caprolactam assume that the production will be carried out in barometric reactors, so-called precondensation tubes. In these processes, however, only a maximum of 8% of AH salt can be added to the $\epsilon$-caprolactam. A procedure using a high water content, owing to the aqueous AH salt solution which as a rule has a solids content of from 50 to 65% by weight, is difficult to control and, with additions greater than 8% of AH salt solution, leads to considerable quality fluctuations through nonuniform evaporation of water and, in spite of a rectification column on the precondensation tube, different amounts of hexamethylenediamine are discharged. Precondensate formed in a pressure stage and comprising a hexamethylenediamine/adipic acid salt solution is therefore mixed with molten caprolactam in a downstream, barometrically operated reactor, and a copolyamide is obtained as the polymerization progresses. However, this process permits the addition of $\epsilon$-caprolactam to the aqueous AH salt solution only in amounts of up to 50% (German Offenlegungschrift 3,912,768).

The disadvantage of this process is that in this case:
a precondensate of higher viscosity is mixed with a low-viscosity product, $\epsilon$-caprolactam, leading to a nonuniform polymer,
only 50% of $\epsilon$-caprolactam can react with an aqueous AH salt solution, whereas lactam additions between 75 and 98% are of interest for the polyamide processor.

European patent application 0 393 546 describes a process for the continuous production of copolyamides, an aqueous solution of diamines and dicarboxylic acids being subjected to a precondensation under pressure and with evaporation of water. In a further process stage, the vapor phase is separated from the prepoymer melt. This melt is mixed with caprolactam and fed in a vertical tube to the polymerization process in order thus to obtain a copolyamide.

The prior art is such that a specially developed reactor type is used for each polymer. This disadvantage is to be overcome by the invention.

OBJECT OF THE INVENTION

The aim and object of the invention is to design a polymerization reactor in which polyamide 6, polyamide 6.6 and a copolyamide of caprolactam and aqueous AH salt solution can be produced. It is also the object to produce polyamide 6, polyamide 6.6 and copolymers by a standardized reaction sequence in a continuous process. For this purpose, the reactors are to be designed in such a way that the process stages of the same type can be carried out in a standard reactor, it being necessary to adapt these reactors to the different procedures.

DESCRIPTION OF THE INVENTION

The procedure in the production of the polymers polyamide 6, polyamide 6.6 and copolyamides was designed according to the invention for a standard reactor in such a way that these polyamides can be produced alternately in the individual treatment stages in the reaction apparatuses.

The following process stages are carried out in such a polymerization reactor:

a) preheating of the starting materials in a common heat exchanger, and b) polymerization of the starting materials in a pressure stage with or without expulsion of water, by a procedure in which, with water expulsion in a rectification column, in each case the caprolactam or the diamine or, in the production of the polyamide, both these products are recycled to the pressure stage, c) dewatering of the polymeric melt in a coiled tube which comprises one to five turns and in which the polymeric melt is subjected to a specific, slow pressure reduction, this coiled tube being designed in such a way that both the high-viscosity polyamide 6 prepolymer and the low-viscosity polyamide 6.6 precondensate under a higher pressure as well as the copolymer are transported or forced without problems into the first postcondensation reactor operated at virtually barometric pressure, d) first postcondensation in a common, vertical reactor at temperatures in the range 210–285° C. and with a process sequence from top to bottom, by forming thin melt films and expelling the water no longer required for the further polymerization process, and e) further postcondensation of the melt in downstream reactors if high viscosities are to be achieved.

According to the invention, polyamide 6 or polyamide 6.6 or copolyamide is produced alternately and, for this purpose, the starting material to be treated, ε-caprolactam, the salt of adipic acid with hexamethylenediamine, adipic acid and hexamethylenediamine, alone or in the form of a mixture, is preheated before being introduced into the pressure reactor. In the pressure reactor, the polymerization is carried out with variable pressures, temperatures and residence times, depending on the type of polyamide, the pressure being generated in the main by the water present in the reaction mixture and the temperature being kept in the range from 150 to 280° C. If required, dewatering of the precondensate of the polyamide types with simultaneous recycling of starting materials via an attached rectification column is carried out and the pressure in the pressure reactor is adjusted to <2.1 MPa. The melt is subsequently subjected to postcondensation in at least one reactor by carrying out a melt level adjustment dependant on the excess of water and expelling the water contained in excess in the prepolymer or precondensate, except for the amount which remains in the melt for establishing the final viscosity. A polymerization equilibrium in the postcondensation at a pressure between 0.1 and 0.15 MPa is established at temperatures in the range from 210 to 285° C.

The starting material is fed continuously via a storage vessel for ε-caprolactam and/or a storage vessel for AH salt solution or a dissolution apparatus for AH salt, with batchwise or continuous introduction of the starting materials, to a transport and measuring means, and the starting material or the mixture is then passed through a heat exchanger.

In a common heat exchanger, the starting material is preheated to a temperature between 190 and 300° C. and introduced into the pressure reactor, also in combination with the energy required for partial evaporation of excess water.

For the production of polyamide 6.6 and copolyamides, an aqueous solution of a salt of adipic acid with hexamethylenediamine or adipic acid and hexamethylenediamine having a water content of ≦40% is used.

The procedure in the pressure reactor is carried out in the range between 190 and 280° C., the temperature being defined as a function of the amount of caprolactam and hexamethylene diamine in the reaction product, and a minimum reaction mixture inlet temperature of 190° C. being established with 40% AH salt content and the temperature being brought to above 230° C. when the AH salt content is increased to 75%. With a content of 90% of AH salt in the reaction mixture, a temperature up to 250° C. is established. In the production of copolyamide from ε-caprolactam with a content of 1 to 99% and aqueous AH salt solution, the excess water in the pressure reactor is removed only at a pressure of >0.6 MPa.

The portions of starting material which leave the pressure reactor during dewatering of precondensate are recycled to said reactor via a rectification column and excess water is removed via a condenser and trap.

For this purpose, the cooling means of the rectification column is preferably integrated in the pipe circulation of the storage or dissolution vessel for AH salt solution.

The dewatering of the polymeric melt is carried out, after a pressure-reducing and transport means, in a coiled tube having one to five turns, by a specific slow pressure reduction in a melt drying zone, and the higher-viscosity polyamide 6 prepolymer or the polyamide 6.6 precondensate under higher pressure or copolymer is transported through said zone into the postcondenser.

The postcondensation of the polymeric melt is carried out in a vertical reactor with the use of elements which increase the surface area and of level regulation dependant on the starting material, at temperatures in the range from 210 to 285° C. and in a virtually barometric procedure from top to bottom, preferably with the additional use of preheated nitrogen. The larger the excess of water in the melt introduced, the lower the product level established in the postcondensation reactor and the smaller the extent to which the melt devolatilization area is increased.

The excess water is removed via a rectifier and trap and the product is removed by means of a discharge pump at the base of the postcondensation reactor. With this design of apparatus, it is also possible to produce a copolyamide which has a caprolactam content of 1 to 99%.

The invention is to be illustrated in more detail with reference to the following examples and with the use of the drawing.

A BRIEF DESCRIPTION OF THE DRAWING

FIG. 1 shows the schematic representation of the arrangement, according to the invention, of the stages of a standard reactor for the continuous production of polyamide 6, polyamide 6.6 and copolyamides.

EXAMPLE 1

A process and an apparatus are described here, ε-caprolactam being converted to polyamide 6. ε-Caprolactam is metered from a storage tank through the pump head 6.1 via the heat exchanger 7 into the pressure reactor 8. The driver of the pump head 6.1 is controlled by the level of the reaction mixture in the pressure reactor 8. In the heat exchanger 7, the ε-caprolactam is heated to a reaction temperature of about 240° C. The water required for hydrolyzing the ε-caprolactam is fed to the ε-caprolactam before entry into the pressure reactor 8 through the water supply 9, as a function of the pressure present in the pressure reactor 8. A viscosity of 1.55 is established in the pressure reactor 8 (solution viscosity, based on polymer/sulfuric acid solution with 1 g of polyamide in 100 ml of 96% strength sulfuric acid).

This process stage is carried out without devolatilization, although the pressure reactor 8 has a gas space.

The low-viscosity polyamide 6 melt is introduced via a so-called melt drying zone 14 into the barometrically operated postcondensation reactor 15, by means of the pressure of 0.7 MPa present in the pressure reactor 8. The volume-spooned introduction is carried out via the pressure-reducing and transport means 13, which is driven by the product level of the postcondensation reactor 15.

In order to evaporate the water in the melt during pressure let-down in the pipeline between pressure-reducing and transport means 13 and postcondensation reactor 15 and to keep the polyamide melt at the desired temperature, the required heat is supplied to said melt in the melt drying zone 14. The melt is uniformly distributed over a vertically arranged expanded metal surface in the postcondensation reactor 15 in order to achieve the greatest possible melt surface area. Nitrogen, preheated to 270° C., is introduced in a direction opposite to the melt flow via the heat exchanger 16 and passes over the melt surface and through the melt layer and entrains essentially lactam and the water present in excess. A separation of the gas mixture is carried out in the rectifier 17, ε-caprolactam being recycled to the postcondensation reactor 15 and nitrogen and water being removed from the process via the trap 18. In the postcondensation reactor 15 a solution viscosity of 2.5 is obtained. The melt is discharged from the reactor by means of the discharge pump 19, a gear pump, and fed to a granulator.

EXAMPLE 2

According to the invention, a copolyamide is to be produced from ε-caprolactam and a salt of adipic acid with hexamethylenediamine (AH salt). For this purpose, 80 parts by weight of AH salt and 20 parts by weight of water are melted in the dissolution vessel 1. The heat for melting is supplied via the heat exchanger 3 by passing the batch over said heat exchanger by means of the pump 2. The aqueous AH salt solution required for the polymerization process is removed continuously from this product circulation with the pump head 6.2.

Water and AH salt are fed batchwise to the dissolution vessel 1. In the intermediate vessel for water 4, water is heated to >100° C. and the required amount of AH salt is initially taken in the container for AH salt 5. While the preheated water enters the dissolution vessel 1 as a result of opening the outlet valves, AH salt is forced into this vessel by means of nitrogen. The dissolution vessel 1, the heat exchanger 3 and the intermediate vessel for water 4 are heated by means of a heating medium.

Lactam and AH salt solution are transported by means of separate pump heads 6.1 and 6.2, which have a common drive. Before entry into the heat exchanger 7, the two products are mixed with one another. 18 parts of the aqueous AH salt solution and 82 parts of ε-caprolactam are metered and are preheated in the heat exchanger 7.

A low-viscosity copolyamide, whose viscosity can be controlled by specific expulsion of water, forms in the pressure reactor 8. In the pressure reactor 8, a pressure of 1.1 MPa is established and the excess water is removed from the process via the control valve 11 and the trap 12 under pressure control. In the rectification column 10, the salt of adipic acid with hexamethylene and lactam are separated from the water and recycled to the reaction mixture in the pressure stage 8. In this pressure stage, a polymer having a solution viscosity of 1.38 forms.

In the melt drying zone 14, the copolyamide melt is heated to 280° C. Since, in the case of this product, the water content in the polymer is greater than when ε-caprolactam is used alone, the devolatilization surface area of the melt in the postcondensation reactor 15 is made larger by lowering the product level in the reactor. For the expulsion of water formed by polycondensation, hot nitrogen which was preheated in the heat exchanger 16 is passed through the postcondensation reactor 15. Separation of the gas mixture is carried out in the dephlegmator 17. While lactam and the salt of adipic acid with hexamethylenediamine are recycled to the postcondensation reactor 15, nitrogen and water leave the polymerization process via a trap 18.

Copolyamide melt which has a solution viscosity of 2.38 is discharged from the postcondensation reactor 15 by means of discharge pump 19, a gear pump. The copolyamide has a melting point of 195° C.

Instead of an 80% strength aqueous AH salt solution, it is also possible to use an aqueous AH salt solution having a commercial concentration of 60%, with the result that the dissolution process described above, before the pump head 6.2, would be dispensed with. However, this advantage is associated with a considerably greater energy requirement.

EXAMPLE 3

According to the invention, the substances adipic acid and hexamethylenediamine are to be reacted to give the polymer polyamide 6.6. An approximately 60% strength aqueous AH salt solution is used and is stored in the dissolution vessel 1 at a product temperature of 90° C. By means of the pump head 6.2, the AH salt solution is transported directly from the dissolution vessel 1, via the heat exchanger 7 as already described in Example 2, into the pressure reactor 8. Since no ε-caprolactam is transported, the piston stroke of the pump head 6.1 is set to zero.

The subsequent technological adjustment and procedure are the same as those described in Example 2. A precondensate having a solution viscosity of 1.2 and, from the postcondensation reactor 15, a polymer having a solution viscosity of 2.4 are obtained.

Since there is more physically dissolved water in the precondensate than in the precondensates of Examples 1 and 2, a comparatively larger devolatilization surface area is required in the postcondensation reactor 15. Here, the product level is lowered further still compared with Example 2 and the expulsion of water is substantially improved by feeding in nitrogen, preheated to 280° C.

What is claimed is:

1. A process permitting the production of either polyamide 6, polyamide 6.6 or copolyamide in the same equipment which comprises preheating starting material to be treated in the process, introducing the preheated material into a pressure reactor, effecting polymerization in the pressure reactor under the pressure, temperature and residence time appropriate for the product, wherein the pressure is controlled to a value less than 20 bar (gauge pressure) by regulating the amount of the water present in the material being polymerized and maintaining the temperature in the range from 150 to 280° C., and postcondensing the polymerization product in at least one reactor at a pressure between 0 and 0.5 bar (gauge pressure) and a temperature in the range from 210 to 285° C., while adjusting the amount of material in the postcondensation reactor by controlling the amount of water in that material and expelling water in excess of the amount which establishes a desired final viscosity of the product of the process.

2. The process as claimed in claim 1, wherein the preheating is to a temperature of 190 to 300° C. and wherein there is partial evaporation of water in the pressure reactor.

3. The process as claimed in claim 2, wherein excess water in the pressure reactor is removed after the pressure has changed by more than 5 bar (gauge pressure).

4. The process as claimed in claim 1, wherein the starting material is an aqueous solution of hexamethylenediamine and adipic acid or a salt thereof having a water content of less than or equal to 40%.

5. The process as claimed in claim 1, wherein the pressure reactor temperature is in the range between 190 and 280° C.

6. The process as claimed in claim 5, wherein the salt content of material in the pressure reactor is at least 40% and the minimum pressure reactor inlet temperature is 190° C.

7. The process as claimed in claim 6, wherein the salt content of material in the pressure reactor is at least 75% and the minimum pressure reactor inlet temperature is above 230° C.

8. The process as claimed in claim 1, wherein the postcondensation is carried out in a vertical reactor at a temperature in the range from 210 to 285° C. and at an approximately barometric pressure from top to bottom.

9. The process as claimed in claim 1, in which a portion of the pressure reactor product containing unreacted starting material is recycled to the pressure reactor.

10. The process as claimed in claim 1, wherein the water content of the polymerization product of the pressure reactor is adjusted prior to the postcondensation step.

11. The process as claimed in claim 10, wherein the water content adjustment is carried out in a coiled tube having at least one turn and the pressure and temperature are reduced over the length of the turn through which the material being adjusted flows.

12. A device for carrying out the process of claim 1, comprising a reactant reservoir, a pressure reactor connected to the reactant reservoir, a heat exchanger in the connection between the reactant reservoir and the pressure reactor, a water reservoir connected to the pressure reactor, a dryer connected to the pressure reactor, a postcondensation reactor having a discharge port connected to the dryer and a nitrogen reservoir connected to the postcondensation reactor.

13. The device as claimed in claim 12, having a first rectifier connected to the pressure reservoir, a second rectifier connected to the postcondensation reactor, a second heat exchanger in the connection between the nitrogen reservoir and the postcondensation reactor and wherein the dryer comprises a coiled tube having one to five turns.

14. The device as claimed in claim 12, having a dissolution vessel disposed upstream of the heat exchanger in the connection between the reactant reservoir and the pressure reactor, and a water supply connected to the dissolution vessel, and wherein the dissolution vessel has an inlet and an outlet interconnected by a recirculation system which includes a heat exchanger.

15. The device as claimed in claim 12, in which the connections of the dryer and the nitrogen reservoir to the postcondensation reactor are disposed such that circulation of material from the dryer and nitrogen circulation are countercurrent to each other.

\* \* \* \* \*